(12) United States Patent
Kawai et al.

(10) Patent No.: US 7,473,665 B2
(45) Date of Patent: Jan. 6, 2009

(54) EXHAUST GAS-PURIFYING CATALYST SYSTEM

(75) Inventors: Masaaki Kawai, Ogasa-gun (JP); Tomohito Mizukami, Ogasa-gun (JP); Yasunori Sato, Ogasa-gun (JP)

(73) Assignee: Cataler Corporation, Shizuoka (JP)

( * ) Notice: Subject to any disclaimer, the term of this patent is extended or adjusted under 35 U.S.C. 154(b) by 373 days.

(21) Appl. No.: 10/943,421

(22) Filed: Sep. 17, 2004

(65) Prior Publication Data

US 2005/0031501 A1 Feb. 10, 2005

(51) Int. Cl.
- *B01D 50/00* (2006.01)
- *F01N 3/00* (2006.01)
- *B01J 27/053* (2006.01)
- *B01J 27/02* (2006.01)
- *B01J 23/00* (2006.01)

(52) U.S. Cl. ............ 502/217; 422/177; 422/180; 60/285; 502/216; 502/223; 502/300

(58) Field of Classification Search ............ 422/177, 422/180; 60/24, 285; 502/66, 243, 303, 502/174, 216, 217, 223, 300
See application file for complete search history.

(56) References Cited

U.S. PATENT DOCUMENTS

| | | | |
|---|---|---|---|
| 5,753,580 A | 5/1998 | Hayashi et al. | |
| 6,420,306 B2 * | 7/2002 | Kurokawa et al. | 502/261 |
| 6,497,848 B1 | 12/2002 | Deeba et al. | |
| 6,881,384 B1 * | 4/2005 | Uenishi et al. | 422/177 |
| 6,911,184 B1 * | 6/2005 | Matsunaga et al. | 422/110 |
| 2003/0021745 A1 * | 1/2003 | Chen | 423/239.1 |
| 2003/0061860 A1 | 4/2003 | Hu et al. | |
| 2003/0100447 A1 | 5/2003 | Deeba et al. | |

FOREIGN PATENT DOCUMENTS

| | | |
|---|---|---|
| EP | 1 121 981 A1 | 8/2001 |
| EP | 1 364 708 A1 | 11/2003 |
| JP | 2-203938 | 8/1990 |

\* cited by examiner

*Primary Examiner*—Walter D Griffin
*Assistant Examiner*—Lessanework T Seifu
(74) *Attorney, Agent, or Firm*—Morrison & Foerster LLP

(57) ABSTRACT

An exhaust gas-purifying catalyst system is provided with a plurality of catalyst layers including a first and a second catalyst layers, supported on a support structure. The first catalyst layer comes into contact with an exhaust gas stream firstly among the plurality of catalyst layers. The second catalyst layer is provided adjacent to the first catalyst layer. The first catalyst layer contains a first noble metal active component including rhodium, together with a powder of a barely soluble barium compound in an amount of 0.05 mol to 0.2 mol per volume in liter of the support structure. The second catalyst layer contains a second noble metal active component.

17 Claims, 3 Drawing Sheets

EXHAUST GAS-PURIFYING CATALYST SYSTEM

BACKGROUND OF THE INVENTION

1. Field of the Invention

The present invention relates to an exhaust gas-purifying catalyst system, and more particularly, to an exhaust gas-purifying catalyst system, which is excellent in the capability of eliminating nitrogen oxides in exhaust gases.

2. Description of the Related Art

In recent years, the regulation of exhaust gas of motor vehicles is being made stricter, increasing the necessity for further decreasing the amounts of hydrocarbons (HC), carbon monoxide (CO) and nitrogen oxides ($NO_x$) in the exhaust gases.

Catalysts having a catalyst active component consisting of a noble metal such as platinum (Pt) carried on a porous carrier such as alumina, which in turn is supported on a heat resistant support structure such as cordierite have been widely used to purify the exhaust gas from a motor vehicle. The supported catalyst noted above is called a 3-way catalyst because the catalyst can oxidize CO and HC and reduce $NO_x$ in the exhaust gas simultaneously. In response to the requirement for stricter regulation of exhaust gas, the layer structure of the 3-way catalyst is being improved from the single layer structure to the double-layer structure or to the tandem type structure or the zone coat structure so as to improve the catalytic performance.

For example, Japanese Patent Disclosure (Kokai) No. 2-203938 discloses a catalyst system of a double-layer structure having a first activated alumina coat layer containing Pd, formed on the surface of a honeycomb structure, and a second activated alumina layer containing Rh, formed on the first layer, in order to improve the catalytic activity under low temperatures and to decrease the amount of platinum used as the noble metal active component. This prior art also teaches that the life of the catalyst system can be improved by adding traces of barium carbonate to each of the first activated alumina layer and the second activated alumina layer.

Further, Japanese Patent Disclosure No. 7-60117 discloses a catalyst system of a double-layer structure having a first alumina layer containing prescribed amounts of Ce, Zr and Pd, formed on the surface of a support, and a second alumina layer containing prescribed amounts of Pt, Rh, Ba and Ce, formed on the first layer, in order to improve the eliminating ability of, particularly, hydrocarbons (HC) in the exhaust gas and to improve the durability of the catalyst system at high temperatures. The barium (Ba) is supplied from an aqueous solution of a water-soluble barium compound such as barium nitrate or barium acetate.

However, the value of regulation in respect of $NO_x$ in the exhaust gas is rendered severer and severer. In this connection, it is of high importance nowadays to develop a catalyst system capable of more effectively eliminating $NO_x$ in the exhaust gas. It should also be noted that, in order to suppress the discharge of $NO_x$ contained in the exhaust gas, in driving the automobile, it has been attempted to employ a control system to control the air-fuel ratio to be from stoichiometric to somewhat rich. However, it has been clarified in recent years that with this control system, a larger amount of $NO_x$ is emitted in the exhaust gas on the contrary.

BRIEF SUMMARY OF THE INVENTION

Accordingly, an object of the present invention is to provide a catalyst excellent in the eliminating performance of $NO_x$.

According to an aspect of the present invention, there is provided an exhaust gas-purifying catalyst system, comprising a plurality of catalyst layers including a first and a second catalyst layers, supported on a support structure, the first catalyst layer coming into contact with an exhaust gas stream firstly among the plurality of catalyst layers, the second catalyst layer is provided adjacent to the first catalyst layer, the first catalyst layer containing a first noble metal active component comprising rhodium, together with a powder of a barely soluble barium compound in an amount of 0.05 mol to 0.2 mol per volume in liter of the support structure, the second catalyst layer containing a second noble metal active component.

DETAILED DESCRIPTION OF THE INVENTION

Figure 1A:
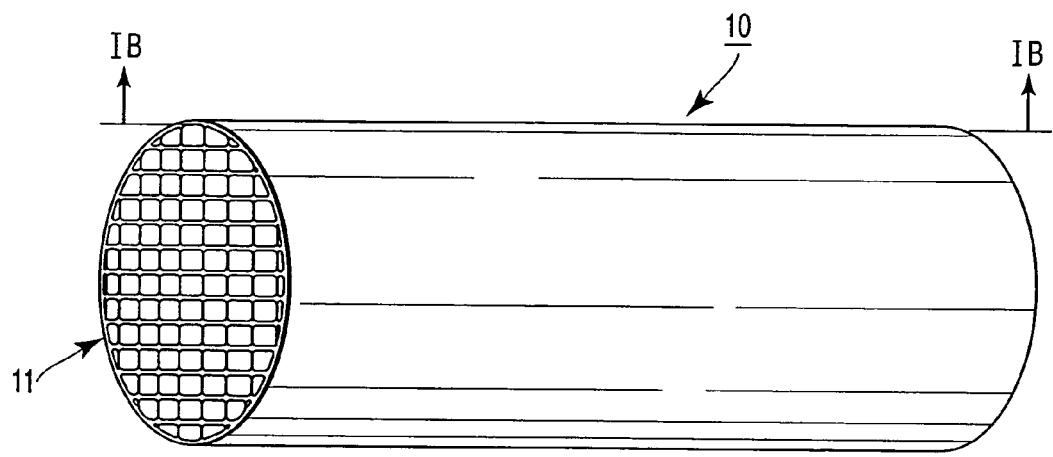
FIG. 1A is an oblique view schematically illustrating a construction of a catalyst system of a multi-layered laminate structure according to one embodiment of the present invention.

The present invention will now be described more in detail.

The present inventors have found that, in a catalyst system comprising a plurality of catalyst layers, it is possible to improve the $NO_x$ eliminating performance of the catalyst system by incorporating, into the catalyst layer that is brought into contact with the exhaust gas firstly among the plurality of catalyst layers, rhodium (Rh) as a noble metal active component and a relatively large amount of a powder of a barely soluble barium compound. The present invention is based on this finding.

An exhaust gas-purifying catalyst-system according to the present invention comprises a first catalyst layer that is brought into contact first with the exhaust gas stream and a second catalyst layer provided adjacent to the first catalyst layer. These first and second catalyst layers are supported on a support structure.

The first catalyst layer contains a noble metal active component comprising rhodium (Rh) and a prescribed amount of a powder of a barely soluble barium compound. The first catalyst layer may contain a powder of a porous oxide material, e.g., a porous refractory inorganic oxide such as alumina, and the noble metal active component may be contained in the first catalyst layer in a state supported on the powdery porous oxide material. The powder of the refractory inorganic oxide material is contained in the first catalyst layer in an amount of usually 30 to 100 g/L (where L denotes the volume in liter of the support structure; the same applies to the following description). The powder of the refractory inorganic oxide material has a particle diameter of usually 2.5 to 4.5 µm and a BET specific surface area of usually 50 to 200 m²/g.

The noble metal contained in the first catalyst layer as a catalyst active component includes rhodium. Rhodium is excellent in its resistance to heat and is low in its deterioration even if arranged in a position where the automobile exhaust gas at a high temperature, containing an oxygen gas in a relatively large amount is brought into contact first with the catalyst system. Rhodium is contained in the first catalyst layer in an amount of preferably 0.1 to 2.0 g/L, more preferably 0.2 to 1.0 g/L.

The first catalyst layer also contains a powder of a barely soluble barium compound. The barely soluble barium compound is the one which is barely soluble in an aqueous solvent, and scarcely forms ions within an acidic solvent to be dissolved in the acidic solvent. Usually, the barely soluble barium compound can be dissolved in 100 g of water at 100° C. only in an amount smaller than 10 mg. Preferable examples of such a barely soluble barium compound include barium sulfate and barium carbonate. Barium sulfate is particularly preferable. The barely soluble barium compound is contained in the first catalyst layer in an amount of 0.05 to 0.2 mol/L. If the amount of the barely soluble barium compound is smaller than 0.05 mol/L, the catalyst system fails to exhibit sufficiently the effect of eliminating $NO_x$ in the exhaust gas. It is certainly possible to obtain the effect of eliminating $NO_x$ in the exhaust gas even if the amount of the barely soluble barium compound exceeds 0.2 mol/L. However, the eliminating effect is saturated in the case where the amount of the barely soluble barium compound exceeds 0.2 mol/L. Since the barium compound contained in the first catalyst layer is barely soluble, there is little tendency that it forms a complex oxide together with a carrier material such as alumina so as to degrade alumina as occurred in the case where barium is supplied by using an aqueous solution of a water-soluble barium compound.

Owing to the fact that the first catalyst layer contains rhodium as a noble metal active component and a powder of a barely soluble barium compound, the eliminating efficiency of $NO_x$ in the exhaust gas can be markedly improved. It is more desirable that the barely soluble barium compound is contained in the first catalyst layer in an amount of 0.06 to 0.15 mol/L. Where the barely soluble barium compound is not contained in the first catalyst layer, the effect of eliminating $NO_x$ in the exhaust gas cannot be improved even if a barium compound is present in the second catalyst layer rather than in the first catalyst layer.

It is desirable that the noble metal active component contained in the first catalyst layer contains platinum (Pt) in addition to rhodium. Where platinum is also contained in the first catalyst layer together with rhodium, the eliminating efficiency of $NO_x$ in the exhaust gas is further improved. Preferably, platinum is contained in an amount of 0.1 to 5.0 g/L.

Also, the first catalyst layer may contain further a cerium-containing oxide. The cerium-containing oxide includes, for example, cerium oxide and complex oxides containing cerium such as cerium zirconium complex oxide. Usually, the cerium-containing metal oxide is present in the form of a powder, and its particle diameter is usually 5 to 15 µm. The cerium-containing oxide exhibits an oxygen absorbing/storing capability so as to absorb the vibration of the air-fuel ratio and, thus, produces the effect of holding the atmosphere of the catalyst in the vicinity of the stoichiometric value.

In the catalyst system of the present invention, the second catalyst layer is provided adjacent to the first catalyst layer and contains a noble metal as a catalytically active component. The second catalyst layer may be arranged adjacent to the first catalyst layer by stacking it on the first catalyst layer in which case the surface planes of the first and second catalyst layers are positioned adjacent to each other. Alternatively, the first and second catalyst layers may be arranged on the same plane side by side as in a zone coat type catalyst system or a tandem type catalyst system described herein later in detail.

The second catalyst layer, like the first catalyst layer, may contain a porous carrier, e.g., a powder of a porous refractory inorganic oxide such as alumina, and the noble metal active component may be supported on a powder of the porous refractory inorganic oxide so as to be contained in the second catalyst layer.

The noble metal active component contained in the second catalyst layer differs from rhodium contained in the first catalyst layer, and may be provided by platinum and/or palladium (Pd). It is desirable that the noble metal active component is contained in the second catalyst layer in an amount of 0.1 to 5.0 g/L.

The second catalyst layer may contain a barely soluble barium compound as described above in an amount described above, and also contain a cerium-containing metal oxide described above.

It is desirable that the cerium-containing metal oxide is contained in the catalyst system of the present invention in an amount of 50 to 200 g/L in total.

In the present invention, the second catalyst layer may be divided into a plurality of sub-catalyst layers. Platinum and palladium, if present together in the same catalyst layer, tends to form an alloy, lowering the catalytic function. Thus, where the second catalyst layer is of a single layer structure, it is desirable that both platinum and palladium are not contained together in the same second catalyst layer. However, the difficulty noted above can be avoided by dividing the second catalyst layer into a first sub-layer containing platinum and a second sub-layer containing palladium so as to allow both platinum and palladium to produce simultaneously the catalytic effects. Each sub-layer can be constructed as described above in detail in conjunction with the second catalyst layer. In this case, platinum may be contained in a sub-layer (the first sub-layer), which immediately follows the first catalyst layer, and palladium may be contained in the subsequent sub-layer (second sub-layer). The cerium-containing oxide as described above may be contained in the first and second sub-layers of the second catalyst layer in an amount described above. Also, where the barely soluble barium compound is contained in the second catalyst layer, it is desirable that the barium compound is contained in the second sub-layer.

The catalyst system of the present invention is supported on an ordinary heat resistant support structure. The heat resistant support structure may be constituted by a single heat resistant support body or may be formed of a plurality of separate heat resistant support bodies. The heat resistant support body includes, for example, a support body having a tubular passageway through which the exhaust gas flows in the axial direction, such as a honeycomb support body including a plurality of such tubular passageways. The heat resistant support body may be formed of a heat resistant ceramic material such as cordierite.

The catalyst system of the present invention can be arranged as a laminated catalyst system, which is prepared by successively laminating the second catalyst layer and the first catalyst layer on the surface of the same heat resistant support body. In this case, the first catalyst layer constitutes the uppermost layer of the laminated catalyst system. Alternatively, the catalyst system of the present invention can be arranged as a so-called "zone coat catalyst" in which the first catalyst layer is formed at a surface zone of a single heat resistant support body on the upstream side with respect to the direction of the exhaust gas stream and the second catalyst layer is formed at a surface zone of the heat resistant support body on the downstream side with respect to the direction of the exhaust gas stream. Further, the first catalyst layer and the second catalyst layer may be formed on the surfaces of separate heat resistant support bodies, and these support bodies may be combined to form a tandem structure.

Some structures of the catalyst system of the present invention will now be described with reference to the accompanying drawings. Throughout the drawings, the similar or same elements are denoted by the same reference numerals.

Figure 1B:
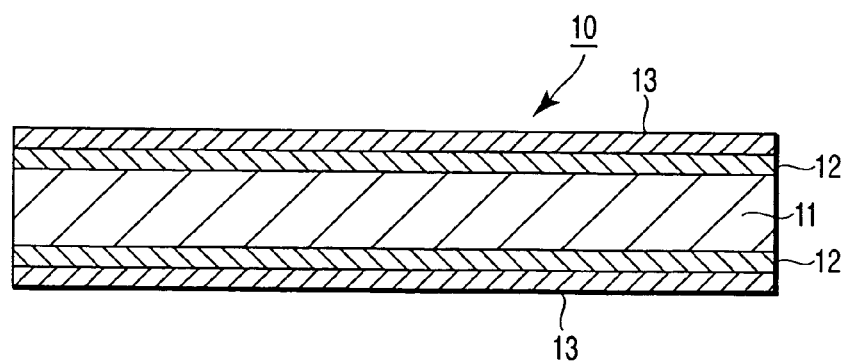
FIG. 1B is an enlarged view illustrating a cross section of the catalyst system illustrated in FIG. 1A taken along the line IB-IB in FIG. 1A.

FIGS. 1A and 1B illustrate a catalyst system 10 in which the first catalyst layer 13 and the second catalyst layer 12 form a laminated structure, which is supported on one cylindrical heat resistant honeycomb support body 11. FIG. 1A is an oblique view illustrating the entire catalyst system 10, and FIG. 1B is an enlarged view of a cross section of the catalyst system 10 taken along the line IB-IB FIG. 1A. In other words, FIG. 1B illustrates the construction in the lateral cross section of the cylindrical portion of the honeycomb support body 11. As clearly illustrated in FIG. 1B, the second catalyst layer 12 is formed to cover the entire surface of the heat resistant honeycomb support body 11, and the first catalyst 13 is formed to cover the surface of the second catalyst layer 12. Needless to say, the first catalyst layer 13 constitutes the uppermost layer of the laminate structure.

Figure 2A:
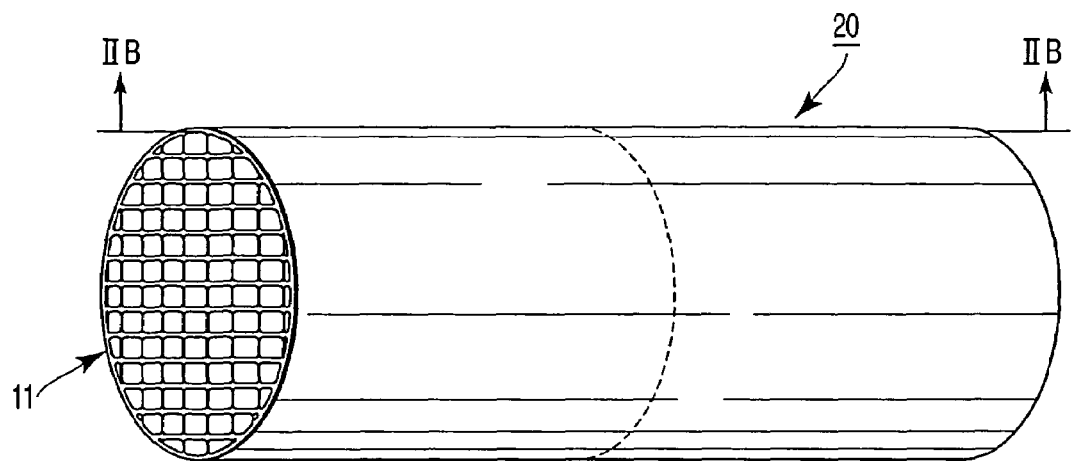
FIG. 2A is an oblique view schematically illustrating a construction of a zone coat type catalyst system according to another embodiment of the present invention.
Figure 2B:
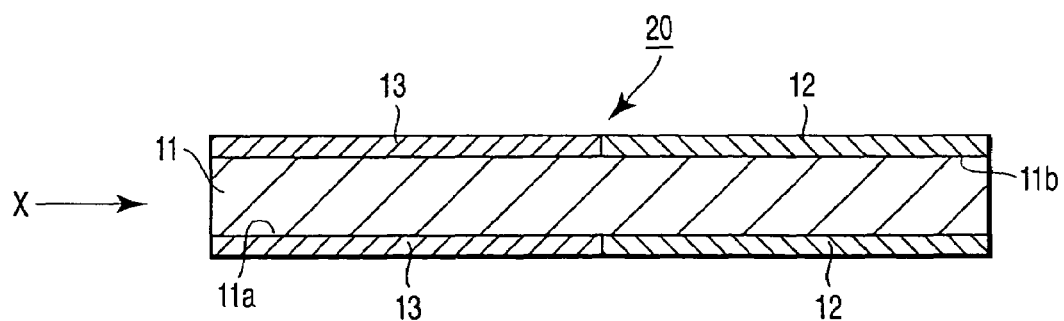
FIG. 2B is an enlarged view illustrating a cross section of the catalyst system illustrated in FIG. 2A taken along the line IIB-IIB in FIG. 2A.

FIGS. 2A and 2B illustrate a catalyst system 20, in which the first catalyst layer 13 and the second catalyst layer 12 are supported on the cylindrical heat resistant honeycomb support body 11 so as to form a zone coat catalyst system. FIG. 2A is an oblique view illustrating the entire catalyst system 20, and FIG. 2B is an enlarged view of a cross section of the catalyst system 20 taken along the line IIB-IIB in FIG. 2A. In other words, FIG. 2B illustrates the construction in the lateral cross section in the cylindrical portion of the honeycomb support body 11. As clearly illustrated in FIG. 2B, the first catalyst layer 13 is formed in a surface zone 11a of the heat resistant support body 11 on the upstream side with respect to the direction of the exhaust gas stream denoted by an arrow X in FIG. 2B, and the second catalyst layer 12 is formed in a surface zone 11b of the heat resistant support body 11 on the downstream with respect to the direction of the exhaust gas stream. In this case, the edge surface of the first catalyst layer 13 is in contact with the edge surface of the second catalyst layer 12.

Figure 3A:
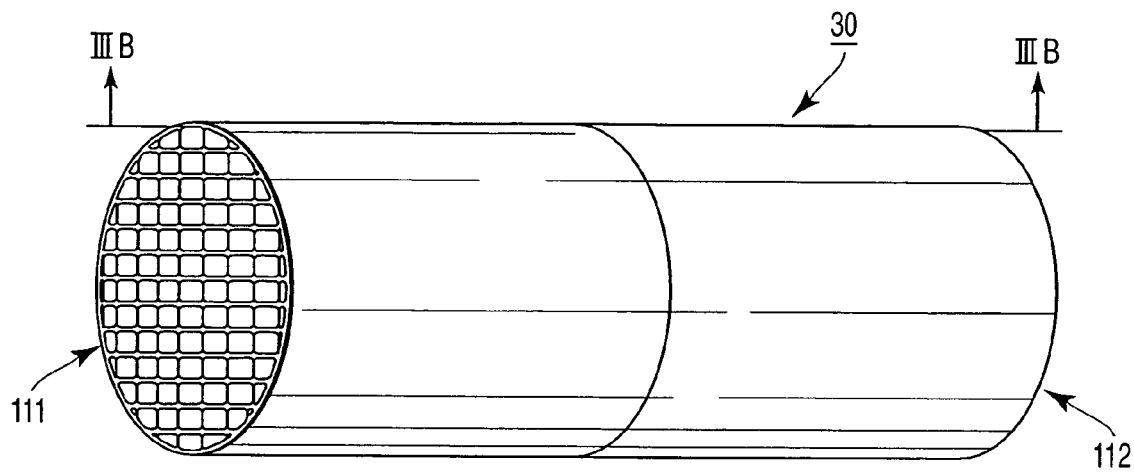
FIG. 3A is an oblique view schematically illustrating a construction of a tandem type catalyst system according to still another embodiment of the present invention.
Figure 3B:
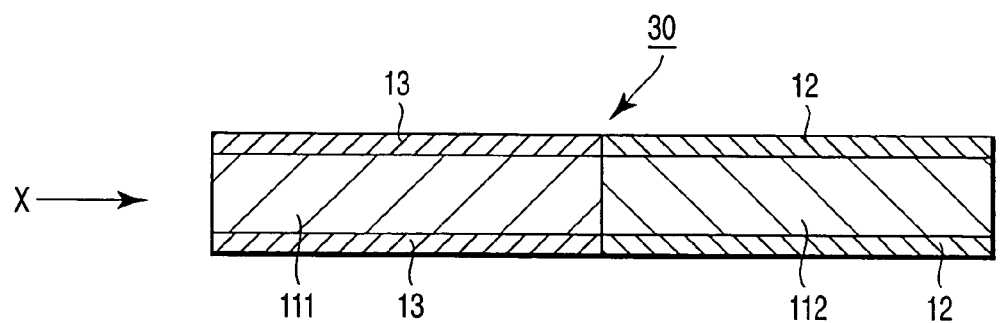
FIG. 3B is an enlarged view illustrating a cross section of the catalyst system illustrated in FIG. 3A taken along the line IIIB-IIIB in FIG. 3A.

FIGS. 3A and 3B illustrate a tandem type catalyst system 30, in which the first catalyst layer 13 and the second catalyst layer 12 are formed on separate cylindrical heat resistant honeycomb bodies 111 and 112, respectively. FIG. 3A is an oblique view illustrating the entire catalyst system 30, and FIG. 3B is an enlarged view illustrating a cross-section of the catalyst system 30 taken along the line IIIB-IIIB in FIG. 3A. In other words, FIG. 3B illustrates the construction in a lateral cross section in the cylindrical portions of the honeycomb structures 111 and 112. As clearly illustrated in FIG. 3B, the first catalyst layer 13 is formed on the entire surface of the first heat resistant honeycomb support body 111 arranged on the upstream side with respect to the direction of the exhaust gas stream denoted by an arrow X in FIG. 3B. On the other hand, the second catalyst layer 12 is formed on the entire surface of the second heat resistant honeycomb support body 112 arranged on the downstream side of the first heat resistant honeycomb structure 111. As illustrated in FIGS. 3A and 3B, the honeycomb support bodies 111 and 112 are arranged in mutual contact at the edge surfaces. However, it is possible to arrange these honeycomb support structures 111 and 112 apart from each other.

The second catalyst layer in the catalyst system of the present invention can be formed by coating an aqueous slurry containing a powder of a refractory porous oxide such as alumina, an aqueous solution of a water-soluble noble metal compound such as platinum nitrate or palladium nitrate, a water-soluble binder such as aluminum nitrate, a powder of a barely soluble barium compound as required, and a powder of a cerium-containing metal compound as required, followed by drying the coated slurry at 200 to 250° C. for about one hour and subsequently baking the slurry at 450 to 600° C. for about 2 hours. The first catalyst layer can be formed by coating an aqueous slurry containing a powder of a refractory porous oxide such as alumina, an aqueous solution of a water-soluble noble metal compound such as rhodium nitrate or platinum nitrate, a powder of a barely soluble barium compound, a water-soluble binder such as aluminum nitrate, and a powder of a cerium-containing metal oxide as required, followed by drying and baking the coated slurry as in the formation of the second catalyst layer. In each of the first and second catalyst layers, the noble metal may be supported on a powdery material (such as a powder of the refractory porous oxide, a powder of a barely soluble barium compound, a powder of a cerium-containing metal oxide), and the powder of the refractory porous oxide used as the main component of the powdery material constitutes the main carrier.

The catalyst system of the present invention is particularly excellent in its capability of eliminating $NO_x$ among HC, CO and $NO_x$ in the exhaust gas. As described previously, it is of high importance nowadays to develop a catalyst capable of effectively eliminating $NO_x$ in the exhaust gas. As described above, it has been attempted to employ the system of controlling the air-fuel ratio to be from stoichiometric to somewhat rich in order to suppress the emission of $NO_x$ in the exhaust gas in driving the automobile; however, it has been clarified in recent years that with this control system, a larger amount of $NO_x$ is contained in the exhaust gas on the contrary. The catalyst system of the present invention can be suitably used to effectively eliminate $NO_x$ from the exhaust gas from the automobile that is driven by this control system.

Some Examples of the present invention will now be described. Needless to say, however, the present invention is not limited by the following Examples.

EXAMPLE 1

A cordierite monolithic honeycomb support body (volume: 1.0 L) was coated with a slurry (slurry 1) consisting of an aqueous platinum nitrate solution (0.5 g of Pt), 100 g of an alumina powder, 50 g of a powder of cerium zirconium complex oxide material, 50 g of an aqueous aluminum nitrate solution having a concentration of 50% by weight, and 200 g of water. Then, the coated slurry was dried at 200 to 250° C. for one hour and subsequently baked at 550° C. for 2 hours, forming a second catalyst layer on the surface of the support body. Next, the surface of the second catalyst layer was coated with a slurry (slurry 2) consisting of an aqueous rhodium nitrate solution (0.5 g of Rh), 100 g of an alumina powder, a powder of barium sulfate, 50 g of an aqueous aluminum nitrate solution having a concentration of 50% by weight, and 150 g of water. The coated slurry was dried at 250° C. for one hour and subsequently baked at 550° C. for 2 hours, forming a first catalyst layer on the surface of the second catalyst layer. The powder of barium sulfate was mixed in the slurry 2 such that the first catalyst layer after the baking step contained 0.1 mol/L of barium sulfate. In this way, a desired catalyst system of a double-layer structure was obtained.

EXAMPLE 2

A cordierite monolithic honeycomb support body (volume: 1.0 L) was coated with the slurry 1 prepared in Example 1, and dried and baked similarly, forming a second catalyst layer. Then, the surface of the second catalyst layer was coated with a slurry (slurry 3) consisting of an aqueous rhodium nitrate solution (0.5 g of Rh), 100 g of an alumina powder, 50 g of a powder of cerium zirconium complex oxide material, a powder of barium sulfate, 50 g of an aqueous aluminum nitrate solution having a concentration of 50% by weight, and 150 g of water, and dried and baked similarly, forming a first catalyst layer on the surface of the second catalyst layer. The powder of barium sulfate was mixed in the slurry 3 such that the first catalyst layer after the baking step contained 0.1 mol/L of barium sulfate. In this way, a desired catalyst system of a double-layer structure was obtained.

EXAMPLE 3

A cordierite monolithic honeycomb support body (volume: 1.0 L) was coated with a slurry (slurry 4) consisting of an aqueous palladium nitrate solution (0.5 g of Pd), 100 g of an alumina powder, 50 g of a powder of cerium zirconium complex oxide material, a powder of barium sulfate, 50 g of an aqueous aluminum nitrate solution having a concentration of 50% by weight, and 200 g of water. The coated slurry was dried at 250° C. for one hour and subsequently baked at 550° C. for 2 hours, forming a second catalyst layer on the surface of the support body. The barium sulfate powder was mixed in the slurry 4 such that the second catalyst layer after the baking step contained barium sulfate in an amount of 0.1 mol/L. Then, the second catalyst layer was coated with the slurry 2 prepared in Example 1, and dried and baked similarly. In this way, a desired catalyst system of a double-layer structure was obtained.

EXAMPLE 4

A cordierite monolithic honeycomb support body (volume: 1.0 L) was coated with a slurry (slurry 5) consisting of an aqueous palladium nitrate solution (0.5 g of Pd), 100 g of an alumina powder, 50 g of a powder of cerium zirconium complex oxide material, a powder of barium sulfate, 50 g of an aqueous aluminum nitrate solution having a concentration of 50% by weight, and 200 g of water. The coated slurry was dried at 250° C. for one hour and subsequently baked at 550° C. for 2 hours, forming a second catalyst layer on the surface of the support body. The barium sulfate powder was mixed in the slurry 5 such that the second catalyst layer after the baking step contained barium sulfate in an amount of 0.1 mol/L. Then, the second catalyst layer was coated with the slurry 2 prepared in Example 1, and dried and baked similarly. In this way, a desired catalyst system of a double-layer structure was obtained.

EXAMPLE 5

A cordierite monolithic honeycomb support body (volume: 1.0 L) was coated with the slurry 5 prepared in Example 4. The coated slurry was dried at 250° C. for one hour and baked at 550° C. for 2 hours, forming a second catalyst layer on the surface of the support body. Then, the surface of the second catalyst layer was coated with the slurry 3 prepared in Example 2, and was dried and baked similarly. In this way, a desired catalyst system of a double-layer structure was obtained.

EXAMPLE 6

A cordierite monolithic honeycomb support body (volume: 1.0 L) was coated with the slurry 5 prepared in Example 4, and dried and baked similarly, forming a second catalyst layer on the surface of the support body. Then, the surface of the second catalyst layer was coated with a slurry (slurry 6) consisting of an aqueous platinum nitrate solution (0.5 g of Pt), an aqueous-rhodium nitrate solution (0.5 g of Rh), 100 g of alumina, a powder of barium sulfate, 50 g of an aqueous aluminum nitrate solution having a concentration of 50% by weight, and 150 g of water. The coated slurry was dried and baked similarly, forming a first catalyst layer. The barium sulfate powder was mixed in the slurry 6 such that the first catalyst layer after the baking step contained barium sulfate in an amount of 0.1 mol/L. In this way, a desired catalyst system of a double-layer structure was obtained.

EXAMPLE 7

A cordierite monolithic honeycomb support body (volume: 1.0 L) was coated with the slurry 5 prepared in Example 4, and dried and baked similarly, forming a second catalyst layer on the surface of the support body. Then, the surface of the second catalyst layer was coated with a slurry (slurry 7) consisting of an aqueous platinum nitrate solution (0.5 g of Pt), an aqueous rhodium nitrate solution (0.5 g of Rh), 100 g of alumina, 50 g of a powder of cerium zirconium complex oxide material, a powder of barium sulfate, 50 g of an aqueous aluminum nitrate solution having a concentration of 50% by weight, and 150 g of water, and dried and baked similarly, forming a first catalyst layer on the surface of the second catalyst layer. The barium sulfate powder was mixed in the slurry 7 such that the first catalyst layer after the baking step contained barium sulfate in an amount of 0.1 mol/L. In this way, a desired catalyst system of a double-layer structure was obtained.

COMPARATIVE EXAMPLE 1

A cordierite monolithic honeycomb support body (volume: 1.0 L) was coated with the slurry 1 prepared in Example 1, and dried and baked similarly, forming a catalyst layer on the surface of the support body. Then, the surface of the catalyst layer was coated with a slurry (slurry 8) consisting of an aqueous rhodium nitrate solution (0.5 g of Rh), 100 g of an alumina powder, 50 g of an aqueous aluminum nitrate solution having a concentration of 50% by weight, and 150 g of water, and dried and baked similarly. Thus, a catalyst system of a double-layer structure for comparison was obtained.

COMPARATIVE EXAMPLE 2

A cordierite monolithic honeycomb support body (volume: 1.0 L) was coated with the slurry 5 prepared in Example 4, and dried and baked similarly, forming a catalyst layer on the surface of the support body. Then, the surface of the catalyst layer was coated with the slurry 8 prepared in Comparative Example 1, and dried and baked similarly. Thus, a catalyst system of a double-layer structure for comparison was obtained.

Table 1 below shows the constructions, excluding alumina, of the catalyst systems of the double-layer structure obtained in the Examples and the Comparative Examples described above.

<Evaluation>

The catalyst system of the double-layer structure prepared in each of Examples 1 to 7 and Comparative Examples 1 and 2 was tested in an automobile having an engine of 2.2 L mounted thereon. The catalyst system was disposed right under the engine and positioned 20 cm away from the engine. The automobile equipped with the catalyst system of the double-layer structure was driven under the U.S. LA#4 mode so as to measure the $NO_x$ amount, the CO amount and the amount of the non-methane hydrocarbons (NMHC) within the exhaust gas downstream of the catalyst system, by using a gas analyzer. Table 2 shows the results.

TABLE 1

Construction of the catalyst systems

| Example No. | First catalyst layer | | | Second catalyst layer | | |
|---|---|---|---|---|---|---|
| | Noble metal | Barely soluble barium compound | Cerium containing oxide | Noble metal | Barely soluble barium compound | Cerium containing oxide |
| Example 1 | Rh | Barium sulfate | None | Pt | None | Cerium zirconium complex oxide |
| Example 2 | Rh | Barium sulfate | Cerium zirconium complex oxide | Pt | None | Cerium zirconium complex oxide |
| Example 3 | Rh | Barium sulfcate | None | Pd | None | Cerium zirconium complex oxide |
| Example 4 | Rh | Barium sulfate | None | Pd | Barium sulfate | Cerium zirconium complex oxide |
| Example 5 | Rh | Barium sulfate | Cerium zirconium complex oxide | Pd | Barium sulfate | Cerium zirconium complex oxide |
| Example 6 | Rh + Pt | Barium sulfate | None | Pd | Barium sulfate | Cerium zirconium complex oxide |
| Example 7 | Rh + Pt | Barium sulfate | Cerium zirconium complex oxide | Pd | Barium sulfate | Cerium zirconium complex oxide |
| Comp. Example 1 | Rh | None | None | Pt | None | Cerium zirconium complex oxide |
| Comp. Example 2 | Rh | None | None | Pd | Barium sulfate | Cerium zirconium complex oxide |

TABLE 2

Results of gas analysis of the exhaust gas

| Example No. | $NO_x$ amount (g/mile) | CO amount (g/mile) | NMHC amount (g/mile) |
|---|---|---|---|
| Example 1 | 0.039 | 1.714 | 0.062 |
| Example 2 | 0.041 | 1.765 | 0.061 |
| Example 3 | 0.05 | 1.660 | 0.068 |
| Example 4 | 0.043 | 1.801 | 0.065 |
| Example 5 | 0.044 | 1.560 | 0.062 |
| Example 6 | 0.037 | 1.602 | 0.059 |
| Example 7 | 0.039 | 1.728 | 0.061 |
| Comparative Example 1 | 0.092 | 1.758 | 0.068 |
| Comparative Example 2 | 0.089 | 1.789 | 0.072 |

The experimental data given in Table 2 clearly support that $NO_x$ in the exhaust gas can be markedly eliminated by the catalyst system of the present invention in which a barely soluble barium compound is present together with rhodium at an area on the upstream side with respect to the direction of the exhaust gas.

Incidentally, in each of the Examples of the present invention described above, the catalyst system was of a laminate structure of a first catalyst layer and a second catalyst layer. However, each of the zone coat type catalyst system as illustrated in FIG. 2 and a tandem type catalyst system as illustrated in FIG. 3 was also found to exhibit the similar performance of eliminating $No_x$.

EXAMPLE 8

A cordierite monolithic honeycomb support body (volume: 1.0 L) was coated with the slurry 4 prepared in Example 3, and dried and baked similarly, forming a lowermost catalyst layer (first sub-layer) on the surface of the support body. Then, the lowermost catalyst layer was coated with the slurry 1 prepared in Example 1, and dried and baked similarly, forming an intermediate catalyst layer (second sub-layer) on the surface of the first sub-layer. Further, the intermediate catalyst layer was coated with the slurry 2 prepared in Example 1, and dried and baked similarly, forming an uppermost catalyst layer on the surface of the second sub-layer. Thus, a desired catalyst system of a three-layer structure was obtained. This catalyst system of the three-layer structure was evaluated as described previously. The $NO_x$ amount in the exhaust gas downstream of the catalyst system was measured by a gas analyzer and found to be 0.04 g/mile.

As described above, the present invention provides a catalyst system excellent particularly in the capability of eliminating $NO_x$ contained in the exhaust gas.

What is claimed is:

1. An exhaust gas-purifying catalyst system, comprising a plurality of catalyst layers including a first and a second catalyst layers, supported on a support structure, the first catalyst layer coming into contact with an exhaust gas stream firstly among the plurality of catalyst layers, the second catalyst layer is provided adjacent to the first catalyst layer, the first catalyst layer containing a first noble metal active component comprising rhodium, together with a powder of a barely water-soluble barium compound comprising barium sulfate in an amount of 0.05 mol to 0.2 mol per volume in liter of the support structure the first layer also containing cerium zirconium complex oxide, the second catalyst layer containing a second noble metal active component, a barely water-soluble barium compound comprising barium sulfate in an amount of 0.05 mol to 0.2 mol per volume in liter of the support structure, the second layer also containing cerium zirconium complex oxide.

2. The catalyst system according to claim 1, wherein the first catalyst layer contains the rhodium in an amount of 0.1 to 2.0 g per volume in liter of the support structure.

3. The catalyst system according to claim 1, wherein the first catalyst layer contains a powder of a first porous oxide which supports at least a portion of the first noble metal active component.

4. The catalyst system according to claim 3, wherein the first porous oxide comprises alumina.

5. The catalyst system according to claim 3, wherein the first catalyst layer contains the first porous oxide in an amount of 30 to 100 g per volume in liter of the support structure.

6. The catalyst system according to claim 1, wherein the first noble metal active component further comprises platinum.

7. The catalyst system according to claim 6, wherein the first catalyst layer contains the platinum in an amount of 0.1 to 5.0 g per volume in liter of the support structure.

8. The catalyst system according to claim 1, wherein the second catalyst layer contains a powder of a second porous oxide which supports at least a portion of the second noble metal active component.

9. The catalyst system according to claim 8, wherein the second porous oxide comprises alumina.

10. The catalyst system according to claim 8, wherein the second catalyst layer contains the second porous oxide in an amount of 30 to 100 g per volume in liter of the support structure.

11. The catalyst system according to claim 1, wherein the second noble metal active component comprises platinum.

12. The catalyst system according to claim 1, wherein the second noble metal active component comprises palladium.

13. The catalyst system according to claim 1, wherein the second catalyst layer contains the second noble metal active component in an amount of 0.1 to 5.0 g per volume in liter of the support structure.

14. The catalyst system according to claim 1, which contains the cerium zirconium complex oxide in an amount of 50 to 200 g in total per volume in liter of the support structure.

15. The catalyst system according to claim 1, wherein the support structure is constituted by a single support body, in which the first and second catalyst layers form a laminate structure on the support body, and the first catalyst layer constitutes an uppermost layer of the laminate structure.

16. The catalyst system according to claim 1, wherein the support structure is constituted by a single support body, in which the first catalyst layer is provided at a surface zone of the support body on an upstream side with respect to the direction of the exhaust gas stream, and the second catalyst layer is provided at a surface zone of the support body on a downstream side.

17. The catalyst system according to claim 1, wherein the support structure comprises a first support body provided on an upstream side with respect to the direction of the exhaust gas stream and a second support body provided downstream of the first support body, in which the first catalyst layer is provided on a surface of the first support body and the second catalyst layer is provided on a surface of the second support body.

* * * * *